(12) United States Patent
Rowe et al.

(10) Patent No.: US 10,321,202 B2
(45) Date of Patent: Jun. 11, 2019

(54) CUSTOMIZED VARIABLE TELEVISION ADVERTISING GENERATED FROM A TELEVISION ADVERTISING TEMPLATE

(71) Applicant: Google LLC, Mountain View, CA (US)

(72) Inventors: Simon M. Rowe, Berkshire (GB); Alastair Peter William Maw, London (GB); Nick Salvatore Arini, Hampshire (GB); Iain Merrick, London (GB); Ant Oztaskent, Surrey (GB); Yaroslav Volovich, Cambridge (GB); Kyle Maddison, London (GB); Andrew Gildfind, Brixton (GB); Raimundo Mirisola, London (GB)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/490,676

(22) Filed: Apr. 18, 2017

(65) Prior Publication Data

US 2017/0223428 A1 Aug. 3, 2017

Related U.S. Application Data

(63) Continuation of application No. 12/702,665, filed on Feb. 9, 2010.

(51) Int. Cl.
*H04N 7/10* (2006.01)
*H04N 7/025* (2006.01)
(Continued)

(52) U.S. Cl.
CPC .......... *H04N 21/812* (2013.01); *G06Q 30/00* (2013.01); *G06Q 30/0251* (2013.01);
(Continued)

(58) Field of Classification Search
CPC .... H04N 21/812; H04N 21/266; H04N 21/84; H04N 21/23424; H04N 21/44016; H04N 21/23418
See application file for complete search history.

(56) References Cited

U.S. PATENT DOCUMENTS

| 5,724,521 A | 3/1998 | Dedrick |
| 5,740,549 A | 4/1998 | Reilly et al. |

(Continued)

FOREIGN PATENT DOCUMENTS

| JP | 2003/189284 | 7/2003 |
| JP | 2009/267474 | 11/2009 |

(Continued)

OTHER PUBLICATIONS

European Search Report in European Application No. 11742670.0, dated Dec. 20, 2013, 11 pages.

(Continued)

*Primary Examiner* — Nasser M Goodarzi
*Assistant Examiner* — Patrick A Ryan
(74) *Attorney, Agent, or Firm* — Fish & Richardson P.C.

(57) ABSTRACT

Methods, systems, and apparatus, including computer programs encoded on a computer storage medium, for providing customized television advertisements. In one aspect, television advertising templates are used for generating customized television advertisements. The television advertisement templates include targeting criteria specifying targeting conditions for the television advertising template, which are conditions for selecting the television advertisement template for an advertisement availability, and content selection criteria specifying availability content associated with an advertisement availability for use in selecting variable advertisement content elements for inclusion in a customized television advertisement generated from the (Continued)

television advertising template. The variable advertisement content elements can include video elements, audio elements, and text elements.

20 Claims, 5 Drawing Sheets

(51) Int. Cl.
H04N 21/81 (2011.01)
H04N 21/234 (2011.01)
H04N 21/44 (2011.01)
H04N 21/258 (2011.01)
H04N 21/266 (2011.01)
H04N 21/84 (2011.01)
G06Q 30/00 (2012.01)
G06Q 30/02 (2012.01)
H04N 21/233 (2011.01)
H04N 21/2668 (2011.01)
H04N 21/482 (2011.01)

(52) U.S. Cl.
CPC ......... *H04N 21/233* (2013.01); *H04N 21/234* (2013.01); *H04N 21/23418* (2013.01); *H04N 21/23424* (2013.01); *H04N 21/25883* (2013.01); *H04N 21/266* (2013.01); *H04N 21/2668* (2013.01); *H04N 21/44016* (2013.01); *H04N 21/4821* (2013.01); *H04N 21/4828* (2013.01); *H04N 21/84* (2013.01)

(56) References Cited

U.S. PATENT DOCUMENTS

| | | | |
|---|---|---|---|
| 5,848,397 | A | 12/1998 | Marsh et al. |
| 5,857,190 | A | 1/1999 | Brown |
| 5,948,061 | A | 9/1999 | Merriman |
| 5,999,912 | A | 12/1999 | Wodarz et al. |
| 6,003,007 | A | 12/1999 | DiRienzo |
| 6,026,368 | A | 2/2000 | Brown et al. |
| 6,044,376 | A | 3/2000 | Kurtzman, II |
| 6,078,914 | A | 6/2000 | Redfern |
| 6,144,944 | A | 11/2000 | Kurtzman, II et al. |
| 6,167,382 | A | 12/2000 | Sparks et al. |
| 6,269,361 | B1 | 7/2001 | Davis et al. |
| 6,285,999 | B1 | 9/2001 | Page |
| 6,324,519 | B1 | 11/2001 | Eldering |
| 6,401,075 | B1 | 6/2002 | Mason et al. |
| 6,438,751 | B1 | 8/2002 | Voyticky et al. |
| 6,507,949 | B1 | 1/2003 | Jonason et al. |
| 6,530,082 | B1 | 3/2003 | Del Sesto et al. |
| 6,983,478 | B1 | 1/2006 | Grauch et al. |
| 6,985,882 | B1 | 1/2006 | Del Sesto |
| 7,136,875 | B2 | 1/2006 | Anderson et al. |
| 7,020,888 | B2 | 3/2006 | Reynolds et al. |
| 7,039,599 | B2 | 5/2006 | Merriman |
| 7,103,904 | B1 | 9/2006 | Blackketter et al. |
| 7,268,896 | B2 | 9/2007 | Bellagamba et al. |
| 7,590,616 | B2 | 9/2009 | Guan et al. |
| 7,778,874 | B1 | 8/2010 | Saunders |
| 8,006,261 | B1 | 8/2011 | Haberman et al. |
| 8,533,761 | B1 | 9/2013 | Sahami |
| 2002/0054091 | A1* | 5/2002 | Tomsen .............. G06Q 10/10 715/748 |
| 2002/0056107 | A1 | 5/2002 | Schlack |
| 2002/0078158 | A1 | 6/2002 | Brown et al. |
| 2002/0087352 | A1 | 7/2002 | Armstrong et al. |
| 2002/0087980 | A1 | 7/2002 | Eldering et al. |
| 2002/0129368 | A1 | 9/2002 | Schlack et al. |
| 2002/0174424 | A1 | 11/2002 | Chang et al. |
| 2003/0037333 | A1 | 2/2003 | Ghashghai et al. |
| 2003/0046161 | A1 | 3/2003 | Kamangar et al. |
| 2003/0070167 | A1 | 4/2003 | Holtz et al. |
| 2003/0093783 | A1 | 5/2003 | Nelson |
| 2003/0115585 | A1 | 6/2003 | Barsness et al. |
| 2003/0115597 | A1 | 6/2003 | Yassin et al. |
| 2003/0171990 | A1 | 9/2003 | Rao et al. |
| 2004/0163107 | A1 | 8/2004 | Crystal |
| 2004/0225562 | A1 | 11/2004 | Turner |
| 2004/0230994 | A1 | 11/2004 | Urdang et al. |
| 2004/0250281 | A1 | 12/2004 | Feininger et al. |
| 2005/0021403 | A1 | 1/2005 | Ozer et al. |
| 2005/0027594 | A1 | 2/2005 | Yasnovsky et al. |
| 2005/0028188 | A1 | 2/2005 | Latona et al. |
| 2005/0065806 | A1 | 3/2005 | Harik |
| 2005/0080668 | A1 | 4/2005 | Rothman et al. |
| 2005/0086612 | A1 | 4/2005 | Gettman et al. |
| 2005/0149396 | A1 | 7/2005 | Horowitz et al. |
| 2005/0222902 | A1 | 10/2005 | Coit et al. |
| 2005/0235318 | A1 | 10/2005 | Grauch et al. |
| 2005/0251444 | A1 | 11/2005 | Varian et al. |
| 2005/0268216 | A1 | 12/2005 | Hayes |
| 2006/0085815 | A1 | 4/2006 | Nguyen-Tran |
| 2006/0195866 | A1 | 8/2006 | Thukral |
| 2006/0224445 | A1 | 10/2006 | Axe et al. |
| 2006/0242013 | A1 | 10/2006 | Agarwal et al. |
| 2006/0242147 | A1 | 10/2006 | Gehrking et al. |
| 2006/0253323 | A1 | 11/2006 | Phan et al. |
| 2006/0288400 | A1 | 12/2006 | Weston |
| 2007/0011050 | A1 | 1/2007 | Klopf et al. |
| 2007/0022003 | A1 | 1/2007 | Chao et al. |
| 2007/0022032 | A1 | 1/2007 | Anderson et al. |
| 2007/0027901 | A1 | 2/2007 | Chan et al. |
| 2007/0157245 | A1 | 7/2007 | Collins |
| 2007/0186229 | A1 | 8/2007 | Conklin et al. |
| 2007/0208751 | A1 | 9/2007 | Cowan et al. |
| 2007/0233558 | A1 | 10/2007 | Jones et al. |
| 2007/0233566 | A1 | 10/2007 | Zlotin et al. |
| 2007/0282906 | A1 | 12/2007 | Gabriel |
| 2008/0019610 | A1 | 1/2008 | Matsuzaka et al. |
| 2008/0040318 | A1 | 2/2008 | Stanis et al. |
| 2008/0092168 | A1 | 4/2008 | Logan et al. |
| 2008/0092182 | A1 | 4/2008 | Conant |
| 2008/0154858 | A1 | 6/2008 | Manavoglu et al. |
| 2008/0195475 | A1 | 8/2008 | Lambert et al. |
| 2008/0201220 | A1 | 8/2008 | Broder et al. |
| 2008/0216107 | A1 | 9/2008 | Downey et al. |
| 2008/0249853 | A1 | 10/2008 | Dekel et al. |
| 2008/0250445 | A1 | 10/2008 | Zigmond et al. |
| 2008/0276266 | A1 | 11/2008 | Huchital et al. |
| 2009/0070230 | A1 | 3/2009 | Silverstein et al. |
| 2009/0070836 | A1 | 3/2009 | Aaby et al. |
| 2010/0122286 | A1 | 5/2010 | Begeja |
| 2010/0242065 | A1 | 9/2010 | Murakami |
| 2011/0078723 | A1 | 3/2011 | Stettner et al. |

FOREIGN PATENT DOCUMENTS

| | | |
|---|---|---|
| JP | 2009/303120 | 12/2009 |
| KR | 2000/0054179 | 9/2000 |
| KR | 10-2000-0063480 | 11/2000 |
| KR | 10-2001-0087545 | 9/2001 |
| KR | 10-2002-0004093 | 1/2002 |
| KR | 2003/0070275 | 8/2003 |
| KR | 2006/0097268 | 9/2006 |
| WO | 97/21183 | 6/1997 |
| WO | 1999/52285 | 10/1999 |
| WO | 2001/65747 | 9/2001 |
| WO | 01/77776 | 10/2001 |
| WO | 2002/31731 | 4/2002 |
| WO | 2003/050731 | 6/2003 |
| WO | 2005/010702 | 2/2005 |
| WO | 2006/020560 | 2/2006 |
| WO | 2006/127645 | 11/2006 |
| WO | 2008/124541 | 10/2008 |

OTHER PUBLICATIONS

AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.

(56) References Cited

OTHER PUBLICATIONS

AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Brin, S., et al., "The Anatomy of a Large-Scale Hypertextual Search Engine", Seventh International World Wide Web Conference, Brisbane, Australia, 20 pages.
Business Wire, "Global Network, Inc. Enters Into Agreement in Principle With Major Advertising Agency," Oct. 4, 1999.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Pat. No. 7,240,025 B2, Control No. 95/001,073.
Request for Reexamination of U.S. Pat. No. 6,446,045 B1, Control No. 95/001,061.
Request for Reexamination of U.S. Pat. No. 7,249,059 B2, Control No. 95/001,069.
Request for Reexamination of U.S. Pat. No. 6,829,587 B2, Control No. 95/001,068.
U.S. Provisional Patent Application for Zlotin, et al., U.S. Appl. No. 60/778,594, filed Mar. 1, 2006, 56 pages.
U.S. Provisional Patent Application for Cowan, et al., U.S. Appl. No. 60/739,580, filed Nov. 22, 2005, 11 pages.
Authorized officer So Young Doo, International Search Report and Written Opinion in PCT/US2007/075618, dated Jan. 9, 2008, 10 pages.
International Preliminary Report on Patentability issued in PCT/US2007/075618 dated Feb. 10, 2009.
Hong, Kyoung hee. Korean Intellectual Property Office. "Notification of Transmittal of the International Search Report and the Written Opinion of the International Searching Authority, or the Declaration," International Application No. PCT/US2011/023966. dated Oct. 13, 2011. (2 pages).
Hong, Kyoung hee. Korean Intellectual Property Office. "International Search Report" International Application No. PCT/US2011/023966. dated Oct. 13, 2011. (3 pages).
Hong, Kyoung hee. Korean Intellectual Property Office. "Written Opinion of the International Searching Authority," International Application No. PCT/US2011/023966. dated Oct. 13, 2011. (5 pages).
Office Action in Canadian Application No. 2789209, dated Jan. 13, 2017, 7 pages.
Office Action in Canadian Application No. 2789209, dated Dec. 11, 2017, 9 pages.

\* cited by examiner

CUSTOMIZED VARIABLE TELEVISION ADVERTISING GENERATED FROM A TELEVISION ADVERTISING TEMPLATE

CROSS-REFERENCE TO RELATED APPLICATIONS

This application is a continuation application of, and claims priority to, U.S. patent application Ser. No. 12/702,665, titled "CUSTOMIZED VARIABLE TELEVISION ADVERTISING GENERATED FROM A TELEVISION ADVERTISING TEMPLATE," filed on Feb. 9, 2010. The disclosure of the foregoing application is incorporated herein by reference in its entirety for all purposes.

BACKGROUND

This specification relates to television advertising.

An advertiser, such as a business entity, can purchase airtime during a television broadcast to air television advertisements. Example television advertisements include commercials that are aired during a program break, transparent overlays that are aired during a program, and text banners that are aired during a program, product placements in a program, etc.

Television advertisements can be targeted for particular programs and events. For example, travel advertisements, e.g., television commercials for cruise packages, can be aired during specific travel-related television programs. Television advertisements, however, are typically created days or even weeks in advance of the television programs during which they air. As a result, the same television advertisements are often aired many times during particular programs, which can lead to ad blindness. Additionally, the television advertisement may not be particularly relevant to the actual content of the television program. For example, the television commercial for cruise packages may be aired for any episode of a particular travel-related program. If the subject of a particular episode of the travel-related program is tropical vacation cruises, then the television advertisement may be of great interest to the viewers. However, if the subject of a particular episode of the travel-related program is skiing in Switzerland, then the television advertisement for tropical cruises may be of less interest to the viewers.

Thus, given the production lead time for television commercials, and the varying subject matter for each episode of a television program, it is difficult, if not impossible, for a single advertiser to produce multiple different television commercials that are tailored to the particular subject matter of a television program and still realize an acceptable advertising return on investment (ROI).

SUMMARY

In general, one aspect of the subject matter described in this specification can be embodied in methods that include the actions of accessing television advertising templates, each of the television advertising templates for use in generating customized television advertisements and including variable advertisement content elements, each variable advertisement content element being selectable for inclusion in a customized television advertisement generated from the television advertising template, targeting criteria specifying targeting conditions for the television advertising template, the targeting conditions being conditions for selecting the television advertisement template for an advertisement availability, and content selection criteria specifying availability content associated with an advertisement availability for use in selecting variable advertisement content elements for inclusion in a customized television advertisement generated from the television advertising template; identifying an advertising availability that satisfies the targeting conditions for one or more of the television advertising templates; selecting one of the television advertising templates having targeting conditions satisfied by the advertising availability; identifying availability content based on the content selection criteria of the selected television advertising template; selecting one or more of the variable advertisement content elements of the selected television advertising template; generating a customized television advertisement from the selected television advertising template and the selected variable advertisement content elements; and providing the customized television advertisement for airing during the advertisement availability that satisfies the targeting conditions of the selected television advertising template. Other embodiments of this aspect include corresponding systems, apparatus, and computer programs, configured to perform the actions of the methods, encoded on computer storage devices.

Another aspect of the subject matter described in this specification can be embodied in methods that include the actions accessing television advertising templates, each of the television advertising templates for use in generating customized television advertisements and including: targeting criteria specifying targeting conditions for the television advertising template, the targeting conditions being conditions for selecting the television advertisement template for an advertisement availability, and content selection criteria specifying availability content associated with an advertisement availability for use in selecting variable advertisement content elements for inclusion in a customized television advertisement generated from the television advertising template; identifying an advertising availability that satisfies the targeting conditions for one or more of the television advertising templates; selecting one of the television advertising templates having targeting conditions satisfied by the advertising availability; identifying availability content based on the content selection criteria of the selected television advertising template; providing to a variable advertisement content provider the identified availability content; receiving from the variable advertisement content provider variable advertisement content elements for the selected television advertising template, each variable advertisement content element being selected for inclusion in a customized television advertisement generated from the television advertising template; generating a customized television advertisement from the selected television advertising template and the received variable advertisement content elements; and providing the customized television advertisement for airing during the advertisement availability that satisfies the targeting conditions of the selected television advertising template. Other embodiments of this aspect include corresponding systems, apparatus, and computer programs, configured to perform the actions of the methods, encoded on computer storage devices.

Another aspect of the subject matter described in this specification can be embodied in methods that include the actions of identifying a television advertisement availability for a television program; selecting a television advertisement template, the television adverting template including: targeting criteria specifying targeting conditions for the television advertising template, the targeting conditions specifying television programs for which the television adverting template may be used to generate a customized television advertisement and content selection criteria specifying keyword types for extracting keywords from electronic program guide descriptions of the television programs during which the identified television availability occurs; wherein the selection of the television advertising template is based on the television program being one of the television programs specified by the targeting criteria; extracting from the electronic program guide information keywords of the keyword types; requesting variable advertisement content elements for the selected television advertising template, the request including the extracted keywords, the variable advertisement content element for inclusion in a customized television advertisement generated from the television advertising template; receiving variable advertisement content elements in response to the request, the variable advertisement content elements having been selected based on the extracted keywords; generating a customized television advertisement from the selected television advertising template and the received variable advertisement content elements; and providing the customized television advertisement for airing during the advertisement availability. Other embodiments of this aspect include corresponding systems, apparatus, and computer programs, configured to perform the actions of the methods, encoded on computer storage devices.

Particular embodiments of the subject matter described in this specification can be implemented to realize one or more of the following advantages. Relevant advertisements that are particularly tailored to the specific subject matter of a program can be provided for presentation. Multiple different television advertisements can be generated from a single television advertising template, and the cost of producing the multiple advertisements from the templates is much less than the cost of producing multiple unique television advertisements. The advantages and features listed above are optional and not exhaustive. The advantages and features can be separately realized or realized in various combinations.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
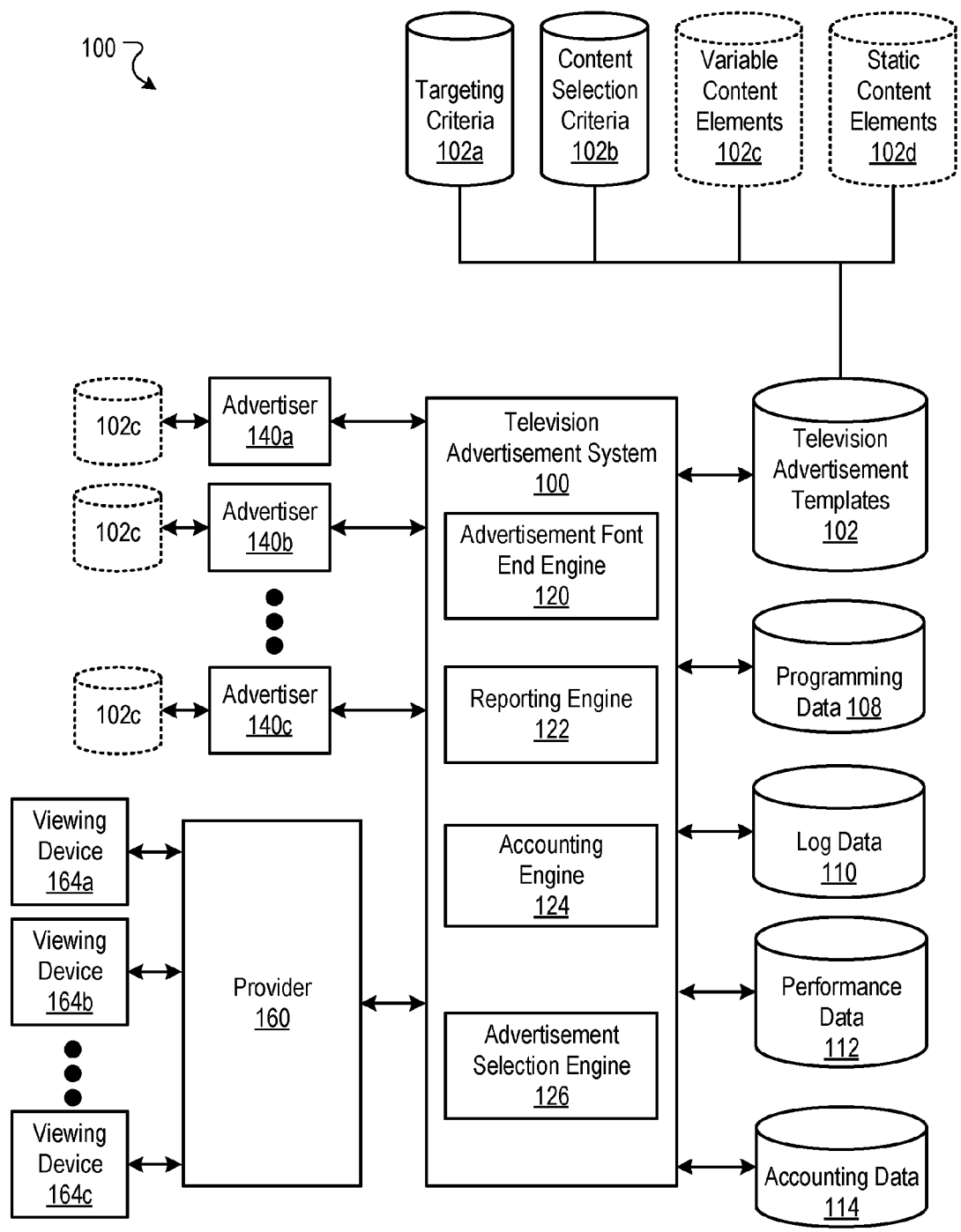
FIG. 1 is a block diagram of an example television advertisement system.

FIG. 1 is a block diagram of an example television advertising system 100. The television advertising system 100 delivers television advertisements to viewers to facilitate operator monetization of programming and quantification of advertisement delivery to target markets. The television advertising system 100 can be implemented on one or more computer servers, and can provide and receive data over a network. Example networks include local area networks (LANs), wide area networks (WANs), telephonic networks, and wireless networks (e.g., 802.11x compliant networks, satellite networks, cellular networks, etc.). Additionally, the television advertising system 100 can communicate over several different types of networks, e.g., the Internet, a satellite network, and a telephonic network.

The television advertising system 100 receives television advertisement templates 102 from advertisers 140, e.g., entities that provide television advertisements. The television advertising system 100 can facilitate the provisioning of customized television advertisements to a television provider 160, e.g., an entity that facilitates the delivery of a television broadcast to viewers, such as a cable provider, a head end, or a digital satellite provider.

The television advertising system facilitates the presentation of customized television advertisements generated from the television advertising templates 102. Customized television advertisements are television advertisements that are presented during a television program and are customized to be relevant to the specific content of the television programming. As used in this description, "specific content" of the television programming refers to the specific subject matter of the television program. Examples of specific subject matter include a particular subject of an episode (e.g., the city of London is a particular subject of an episode of a travel related program, a series of conflicts, such as the War of the Roses, is a particular subject of an episode of history related program, and particular teams, such as Queens Park Rangers and Preston North End, are particular subjects of a televised sporting event). Specific content thus relates to the specific subject of a particular television program. Conversely, the general content of a television program, which is the topic or category to which the program belongs—e.g., a travel related program, a sports related program—does not always identify the specific content of the television program.

The provider 160 provides advertisement availability schedules to the television advertising system 100. Example advertisement availability schedules include scheduling data related to advertisement spots, times slots, pods (groups of time slots), screen real estate (e.g., a region in a text banner or screen corner for an overlay), etc.

The television advertising system 100 selects advertisements to air during an advertisement availability based on programming content, account advertiser bids, budgets, quality metrics that have been collected, e.g., conversions, viewer actions, impressions, etc. In particular, the television advertising system 100 selects television advertising templates 102 and generates customized television advertisements based on the specific content of television programs. Advertisements for airing are then provided to the provider 160.

In some implementations, the television advertising system 100 includes data stores storing television advertising templates 102, programming data 108, log data 110, performance data 112, and accounting data 114.

Each television advertising template include targeting criteria 102a, content selection criteria 102b, variable content elements 102c, and static content elements 102d. The targeting criteria 102a specify targeting conditions for a television advertising template 102. The targeting conditions are conditions that must be satisfied for the television advertisement template to be selected for a particular advertisement availability.

The content selection criteria 102*b* specify availability content associated with an advertisement availability for use in selecting variable advertisement content elements for inclusion in a customized television advertisement generated from the television advertising template 102. As used herein, the term "availability content" is data that specifies the specific content of a television program for a particular advertisement availability. Example availability content is programming data 108, such as electronic programming guide data. For example, for a 30-second advertisement availability that occurs during a particular episode of a travel related program, the availability content is the electronic programming guide data that specifies the specific content of the particular episode of the program.

The variable advertisement content elements 102*c* are selectable for inclusion in a customized television advertisement generated from the television advertising template. Example variable content elements include video elements, i.e., video data that generate television video and that can be used in a customized television advertisement; audio elements, i.e., audio data that generates television audio and that can be used in a customized television advertisement; and text elements, i.e., text data that generate television text and that can be used in a customized television advertisement.

The static content elements 102*d* are content elements (e.g., video elements, audio elements, and text elements) that are included in each customized television advertisement generated from a television advertising template 102. For example, a particular television advertising template 102 may specify that each customized commercial begins with a video of a plane leaving an airport, and the audio line "It's time to get away to your destination." The video of the plane and the audio line are thus static content elements, as they are included in every customized commercial.

The television advertisement templates 102 can, for example, include additional data that can also be used in selecting the templates 102, such as cost per action parameters, frequency values, competitive restrictions, advertising budget data, geographic data, targeting data, etc. The parameters for each template can, for example, be specified by the advertiser 140 that manages the template, and/or can be automatically updated based on the performance of advertisements during an advertisement campaign.

The log data 110 includes data logs from viewing devices 164, e.g., set top boxes, satellite receivers, etc. The log data can include reporting data that identifies channel tunes, e.g., a channel identifier to which the viewing device was tuned, such as may occur when the viewing device 164 is processing video data to record and/or display, and channel tune times, e.g., the times that the viewing device was tuned to a channel.

The performance data 112 includes quality data, e.g., a total number of impressions for each advertisement, or an impression rate for each advertisement, and/or other quality parameter and/or impression parameters.

The accounting data 114 includes accounting data related to advertisements and advertisers 140. Example accounting data 114 includes campaign budgets, monthly spend parameters, and account balances for advertisers.

The example television advertising system 100 includes an advertisement front end engine 120, a reporting engine 122, an accounting engine 124 and an advertisement selection engine 126. The advertisement front end engine 120, reporting engine 122 accounting engine 124 and the advertisement selection engine 126 can, for example, be distributed among a plurality of computer devices, e.g., server computers communicating over a network.

The advertisement front end engine 120 receives advertisement data and television advertisement templates 102 from the advertisers 140. For example, the advertisement front end engine 120 can be implemented in software, and which includes an API and network interface for establishing data communications with computer devices of the advertisers 140.

The reporting engine 122 receives television advertisement report data from the provider 160 and determines whether the selected television advertisement aired is based on the television advertisement report data, and can determine whether an impression should be attributed to the airing.

The accounting engine 124 receives the impression data from the reporting engine 122 and generates accounting data for advertisers, e.g., the accounting data can detail fees owed to the television advertising system 100.

The advertisement selection engine 126 accesses the television advertising templates 102 and identifies an advertising availability that satisfies the targeting conditions for one or more of the television advertising templates 102. Those television advertising templates 102 that have targeting conditions that the advertising availability satisfies are then selected. If more than one television advertising template 102 is selected for the same advertising availability, e.g., two or more templates 102 are selected for the same 30 second advertising spot, then the advertisement selection engine 126 can select one of the television advertising templates 102 based on one or more selection criteria, e.g., performance data, a rank in an auction, etc.

Once the advertisement selection engine 120 selects a television advertising template 102, the advertisement selection engine 120 identifies availability content based on the content selection criteria 102*b* of the selected television advertising template. Availability content is data that specifies the specific content of a television program for a particular advertisement availability. For example, assume advertisement selection engine 122 uses the programming data 108, e.g., electronic programming guide data, as the availability content. For a particular template 102, its corresponding content selection criteria 102*b* are keyword selection criteria specifying keyword types for extracting keywords from electronic program guide descriptions of the television programs. For example, for a template targeted to availabilities during travel related programs, the keyword selection criteria may specify that a program category keyword and any keywords specifying a country, city or geographic region be extracted from the electronic program guide data. Likewise, for a template targeted to availabilities during a televised sporting event, the keyword selection criteria may specify that keywords specifying the team names and type of sport (e.g., "football") be extracted from the electronic program guide data.

The content selection criteria 102*b* can also include keyword matching criteria specifying, for each variable advertisement content element, one or more matching keywords. The variable advertisement content elements 102*c* having matching keywords that match the extracted keywords are selected for inclusion in a customized advertisement. For example, assuming that a customized advertisement for a sports drink is to be made for airing during a televised football match between two teams—the Queens Park Rangers and Preston North End soccer teams. The advertising template 102 for the customized advertisement has, as variable content elements 102c, short video clips of many players from many different soccer teams for possible inclusion in the customized advertisement. Furthermore, the content selection criteria 102b specifies that the names of the sports teams are to be extracted from electronic programming guide data. A short video clip of a player from the Queens Park Rangers, and another short video clip of a player from Preston North End, have the respectively specified matching keywords of "queens park rangers" and "preston north end." As the extracted keywords for the televised football match are "Queens Park Rangers" and "Preston North End," the short video clips of the players from these teams are selected and included in the customized advertisement. Accordingly, the customized television advertisement will likely hold a viewer's interest more effectively than a non-customized advertisement that has a video clip of a player or sports figure from a team other than the Queens Park Rangers or Preston North End.

Figure 2A:
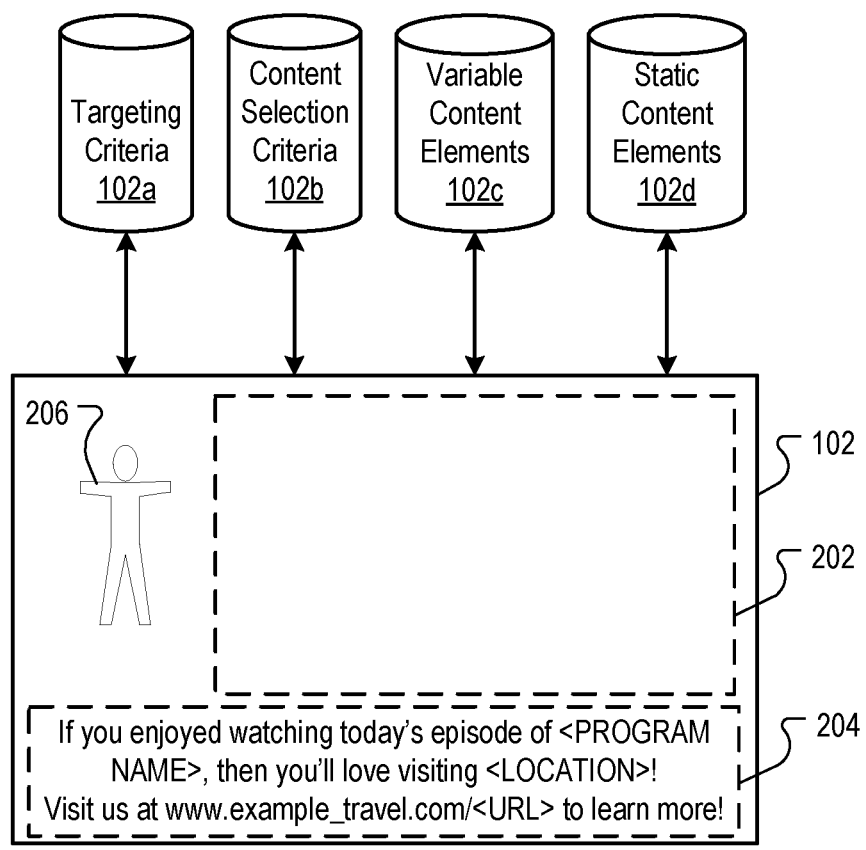
FIGS. 2A-2C are block diagrams of an example television advertising template and customized advertisements generated from the television advertising template.
Figure 2B:
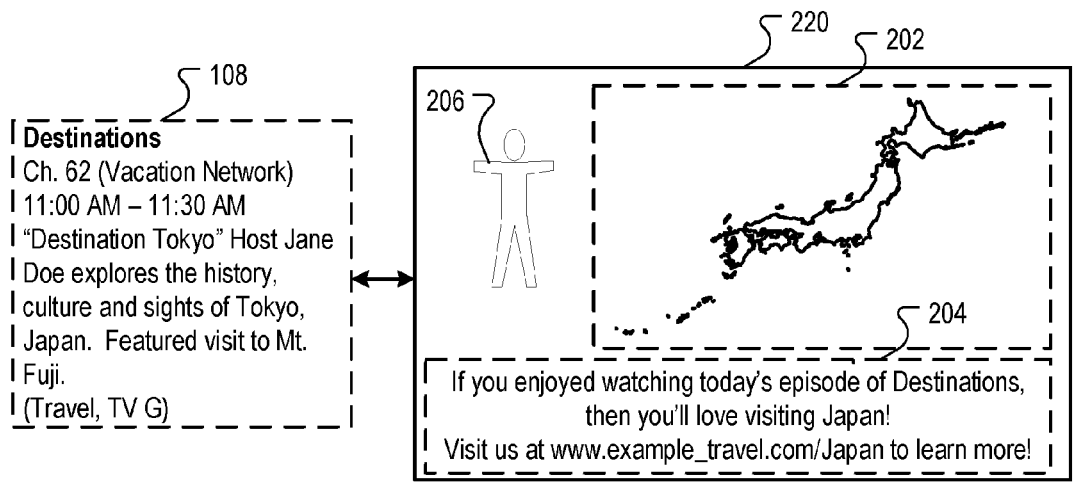
Figure 2C:
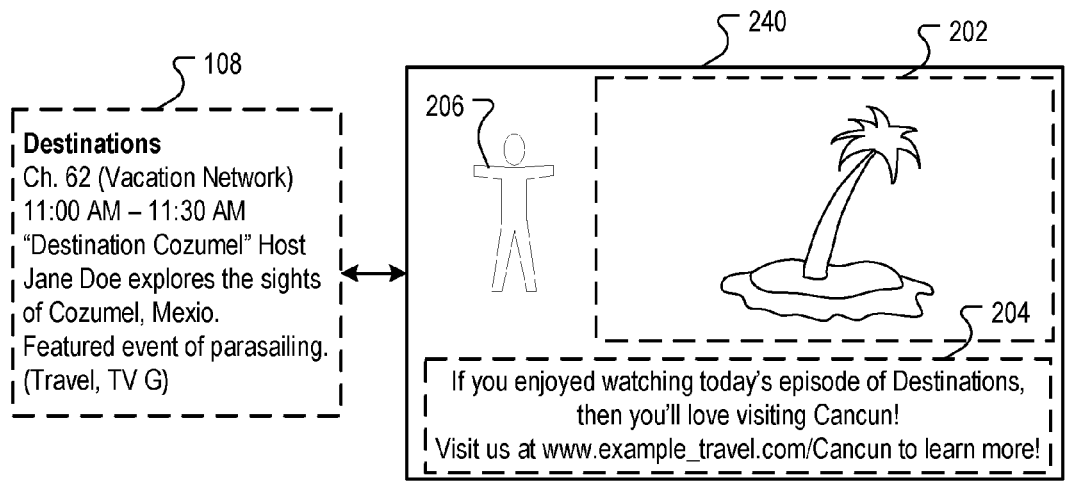

Another example of generating customized television advertisements is shown in FIGS. 2A-2C, which are block diagrams of an example television advertising template 102 and customized advertisements 220 and 240 generated from the television advertising template.

FIG. 2A graphically depicts an advertising template 102 with areas 202, 204 and 206 in which variable content elements 102c and static content elements 102d are shown. The area 202 is an area in which a video clip or image of a selected variable content element 102c is rendered. The area 204 is an area in which advertisement text is shown. The text includes variable files <PROGRAM NAME>, <LOCATION>, and <URL>, each of which receive text corresponding to selected variable content elements 102c. A video clip of spokesperson 206 is also depicted in FIG. 2A. The video clip is the same for all customized advertisements, and the spokesperson speaks the same line of audio in each commercial. For example, the television advertising template 102 is directed to advertising vacation packages, and the line of audio is generic with respect to locations, e.g., "Example Travel has the best rates to locations just like those shown in the program you are watching right now—visit us on the web at the address below to find out more!"

The targeting criteria 102a, for example, specifies particular television programs by their name and programming times. For example, the targeting criteria specifies three travel programs—e.g., "Destinations," "Get Aways," and "Long Weekends," and specifies the time period between 9:00 AM and 10:00 PM. Accordingly, any of the three travel programs airing between the specified time will satisfy the targeting criteria 102a, and thus so will the advertisement availabilities during those programs.

The content selection criteria 102b specifies keywords to extract from the electronic program guide data describing a particular episode of the programs. For example, the content selection criteria may specify the program name as a keywords for extraction, and the location name as a keywords for extraction. Using this content selection criteria 102b, the advertisement selection engine 126 will extract from the electronic program guide information the program name and the location names that satisfy the targeting criteria 102a.

The content selection criteria 102b also specifies matching keywords for variable content elements 102c. For example, the video clip shown in the area 202 are location specific. Accordingly, a video clip depicting visual features of Japan may be associated with the matching keywords "Japan," "Tokyo," "Mt. Fuji," "Osaka," etc. Conversely, a video clip depicting visual features of vacation spots in the Yucatán Peninsula may be associated with the keywords "Yucatán," "Cancun," "Cozumel," "Holbox," etc. Likewise, various location names be associated with each other so that the customized advertisements may reference any of the vacation locations in the Yucatán Peninsula. For example, if the keyword "Cozumel" is extracted from the electronic program guide information, then the location shown in the area 204 may be any of Cancun, Cozumel, Holbox, etc. Additionally, different audio tracks, e.g., background music, can be associated with matching keywords. For example, a first audio track of Japanese inspired music can be associated with matching keywords "Japan," "Tokyo," "Mt. Fuji," "Osaka," etc. Likewise, a second audio track of Mexican inspired music can be associated with matching keywords "Yucatán," "Cancun," "Cozumel," "Holbox," etc.

Finally, additional variable content elements 102c can also be associated with matching keywords. For example, a portion of a URL string can be specified with matching keywords so that the displayed URL is one that includes data specific to the location being shown in the customized television advertisement.

FIG. 2B graphically depicts a customized advertisement 220 generated from the template 102 of FIG. 2A. The customized advertisement 220 is generated for a particular episode of the travel program "Destinations." As the travel program is one of the targeted programs for the television advertising template 102, and airs during the specified targeted time period, the advertisement selection engine 126 selects the television advertising template 102 to generate a customized television advertisement to air on a commercial spot during the television program.

Using the content selection criteria 102b, the advertisement selection engine extracts the keywords "Destinations," "Tokyo," "Japan," and "Mt. Fuji" from the electronic programming guide data 108. Using these keywords, the advertisement selection engine 126 selects a video clip related to Japan and selects text to populate the text fields in the television advertising template. The video clip that is selected is a video clip that has an associated matching keyword that match one or more the keywords "Tokyo," "Japan," and "Mt. Fuji." Likewise, the text that is selected are words that have associated matching keywords that match one or more of the keywords "Destinations," "Tokyo," "Japan," and "Mt. Fuji." Additionally, Japanese inspired background music is also played during the airing of the customized television advertisement 220.

FIG. 2C graphically depicts a customized advertisement 240 generated from the template 102 of FIG. 2A. The advertisement 240 is similar to the advertisement 220 of FIG. 2B, except that the variable content elements that are selected result in a television advertisement that is customized to the location of Cancun, Mexico.

In some implementations, the advertisement selection engine 126 generates the customized television advertisements in near real time, e.g., minutes or even seconds before the customized television advertisements actually aired. In other implementations, the advertisement selection engine 126 generates the customized television advertisements well in advance of airing a particular program, e.g., hours or even days before the program airs.

In some implementations, the variable content elements 102c and static content elements 102d are stored with the television advertising template data 102 at the television advertising system 100. In other implementations, the variable content elements 102c and static content elements 102d are stored in a server maintained by respective advertisers 140, and the television advertising system 100 accesses the respective servers by means of an appropriate API or other communication method. The servers at the respective advertisers receive information specifying the selected template and availability content, and provide the corresponding variable content elements 102c in return. In this latter implementation, the respective advertisers 140 can update the variable content elements 102c and static content elements 102d more quickly than if those elements are maintained at the television advertising system 100.

Although the electronic program guide is used an example programming data source, other data can also be used. For example, closed captioning data can be used for the programming data instead of, or in addition to, electronic programming guide data.

Figure 3:
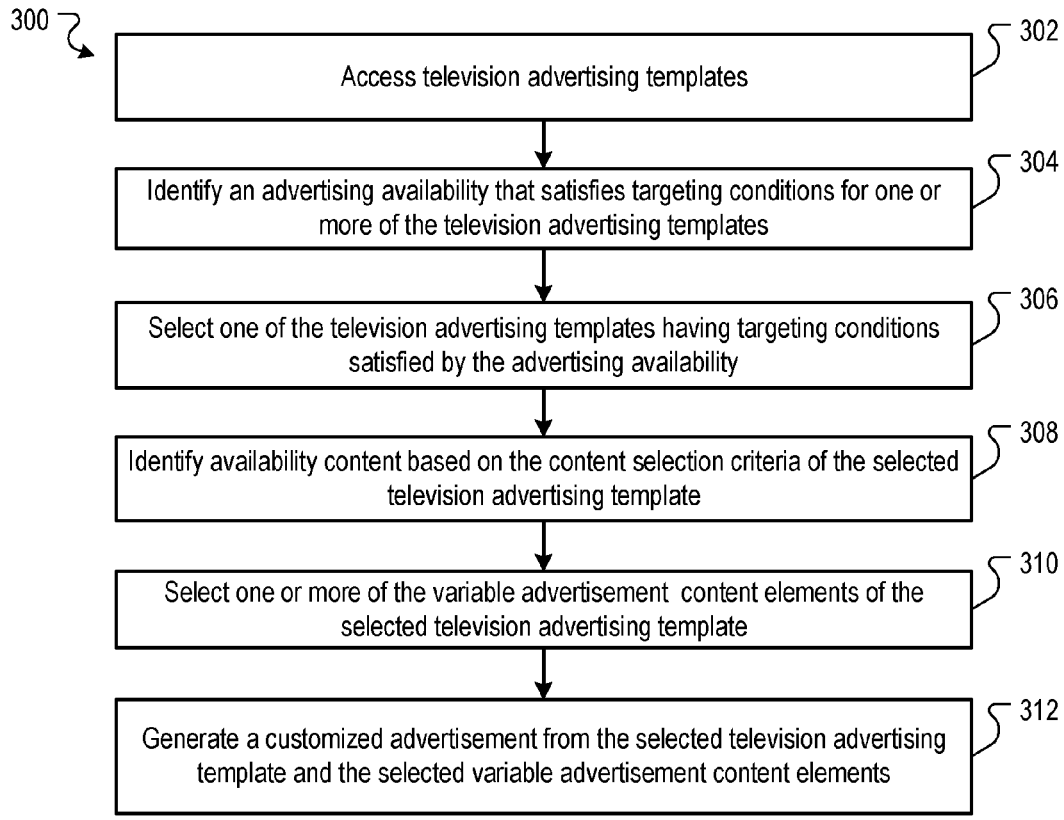
FIG. 3 is a flow diagram of an example process for generating a customized television advertisement from a television advertising template.

FIG. 3 is a flow diagram of an example process 300 for generating a customized television advertisement from a television advertising template. Example process 300 can be implemented in the television advertising system 100, or other data processing apparatus in data communication with the television advertising system 100.

The process 300 accesses television advertising templates (302). For example, the advertisement selection engine 126 accesses television advertising template data 102, which stores television advertising templates for advertisers 140.

The process 300 identifies an advertising availability that satisfies targeting conditions for one or more of the television advertising templates (304). For example, the advertisement selection engine 126 identifies commercial spots during a particular television program that satisfies targeting conditions for one or more of the television advertising templates 102.

The process 300 selects one of the television advertising templates having targeting conditions satisfied by the advertising availability (306). For example, if only one television advertisement template 102 has targeting conditions that are satisfied by the advertising availability, then that television advertisement template 102 is selected. Conversely, many television advertisement templates have targeting conditions that are satisfied by the availability, and one of the television advertisement templates is selected based on, for example, an auction.

The process 300 identifies availability content based on the content selection criteria of the selected television advertising template (308). For example, the advertisement selection engine 126 identifies particular keywords of the electronic program guide data as availability content.

The process 300 selects one or more the variable advertisement content elements of the selected television advertising template (310). For example, the advertisement selection engine 126 selects variable advertising content elements associated with matching keywords that match the keywords extracted from the electronic program guide data.

The process generates a customized advertisement from the selected television advertising template and the selected variable advertisement content elements (312). For example, the advertisement selection engine 122 generates a customized television advertisement by rendering the variable advertisement content elements, along with static content elements, if any, to generate customized television advertisement.

Figure 4:
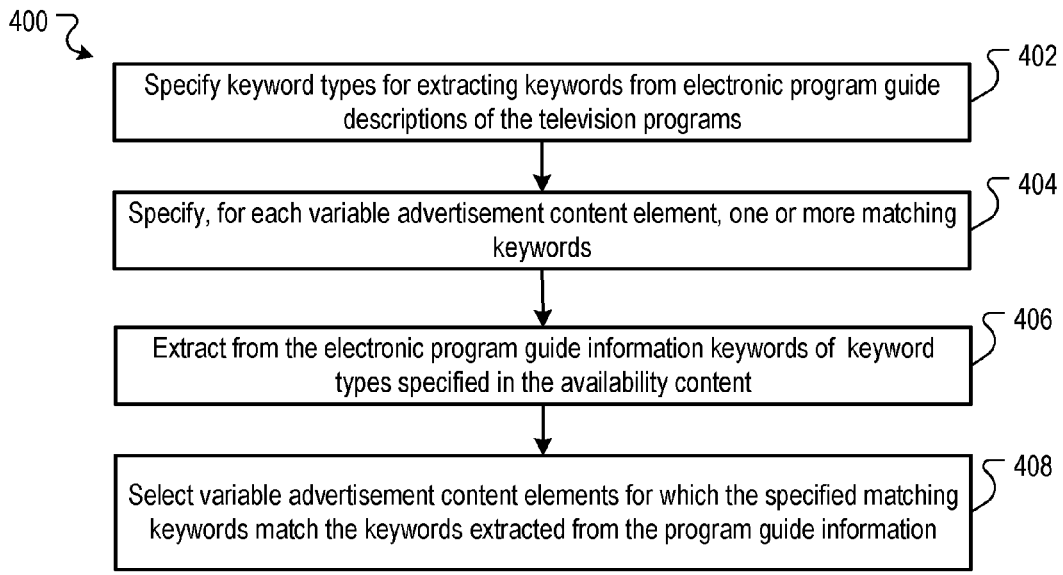
FIG. 4 is a flow diagram of an example process for selecting variable advertisement content based on electronic programming guide information.

FIG. 4 is a flow diagram of an example process for selecting variable advertisement content based on electronic programming guide information. Example process 400 can be implemented in the television advertising system 100, or other data processing apparatus in data communication with the television advertising system 100.

Process 400 specifies keyword types for extracting keywords from electronic program guide descriptions of the television programs (402), and specifies, for each variable advertisement content element, one or more matching keywords (404). For example, an advertiser 140 can upload the content selection criteria 102b to the television advertising system 100, and the content selection criteria 102b is stored in the television advertising system 100. The advertiser 140 has specified various keywords for extraction from program guide information for a particular television advertising template, and has selected matching keywords for each of the variable content elements 102c.

The process 400 extracts from the electronic program guide information keywords or keyword types specified in the availability content (406). For example, for selected television advertising template 102, the advertisement selection engine 126 accesses the content selection criteria 102b, and uses content selection criteria 102b to extract the specified keywords from the electronic programming guide information.

The process 400 selects variable advertisement content elements for which the specified matching keyword match the keywords extracted from the program guide information (408). For example, the advertisement selection engine 126 compares the extracted keywords to the matching keywords the variable content elements 102c. Variable content elements having matching keywords that match the extracted keywords are selected. If multiple variable content elements are selected, then, in some implementations, the variable content element can be randomly selected from the multiple variable content elements. In other implementations, the least most selected verbal content element among multiple variable content elements can be selected to increase diversity in the customized television advertisements.

In some implementations, the advertisement templates 102 can have content selection criteria 102b specifying that content be selected based on local data stored at a subscriber's location. For example, a viewing device 164 can store data local to a particular subscriber, e.g., a zip code of the subscriber and a city name corresponding to the zip code. The advertisement data provided to the viewing device can include data that is filtered based on the local data. For example, the advertisement data can include local phone numbers based on zip codes, and the viewing device can filter the advertisement data so that the advertisement generated from the advertisement data includes only the local phone number corresponding to the subscriber's zip code.

Figure 5:
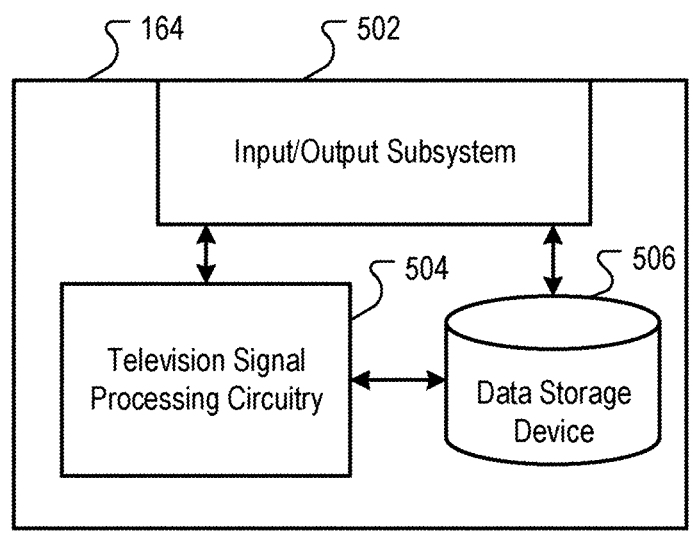
FIG. 5 is a block diagram of an example viewing device.

FIG. 5 is a block diagram of an example viewing device 164. The viewing device 164 includes an input/output (I/O) subsystem 402, television signal processing circuitry 504, and a data storage device 506.

The I/O subsystem 502 can receive video signals from the provider 160 and can provide a video signal output for display on a television display device. The data storage device 506 stores local data, such as the subscribers zip code, location, demographics, etc.

The television processing circuitry 504 generates video signals for display on a television display device. Additionally, the television processing circuitry 504 selects data for display with television advertisements based on the local data stored in the storage device 506. For example, advertisement data for an advertisement generated from an advertisement template 102 can include a mapping of zip codes to local phone numbers. The television processing circuitry 504 can access the zip code stored in the data storage device 506 and select the phone number corresponding to the zip code stored in the data storage device 506. This phone number can then be displayed as part of the television advertisement.

The viewing device 164 can be implemented as a set-top box, a satellite receiver, or other device capable of receiving video input data and outputting a video signal for display on a television device.

The apparatus, methods, flow diagrams, and structure block diagrams described in this patent document may be implemented in computer processing systems including program code comprising program instructions that are executable by the computer processing system. Other implementations may also be used. Additionally, the flow diagrams and structure block diagrams described in this patent document, which describe particular methods and/or corresponding acts in support of steps and corresponding functions in support of disclosed structural means, may also be utilized to implement corresponding software structures and algorithms, and equivalents thereof.

Embodiments of the subject matter described in this specification can be implemented as one or more computer program products, i.e., one or more modules of computer program instructions encoded on a tangible program carrier for execution by, or to control the operation of, data processing apparatus. The computer readable medium can be a machine readable storage device, a machine readable storage substrate, a memory device, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with some implementations of the subject matter described is this specification, or any combination of one or more such back end, middleware, or front end components. The components of the system can be interconnected by any form or medium of digital data communication, e.g., a communication network. The computing system can include clients and servers. A client and server are generally remote from each other and typically interact through a communication network. The relationship of client and server arises by virtue of computer programs running on the respective computers and having a client server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

What is claimed is:

1. A computer-implemented method performed by a data processing apparatus, comprising:
identifying a future advertising availability scheduled to occur during a given episode of a given video program that has multiple episodes that each present different specific content of the given video program;
identifying a plurality of video advertising templates that are each associated with respective targeting criteria that specify one or more video programs each including multiple episodes during which customized video advertisements generated using the video advertising template are eligible to be presented;
selecting, from the plurality of video advertising templates, a given video advertising template for the given video program based at least on the given video program being specified by the targeting criteria for the given video advertising template;
selecting, from a plurality of advertisement content elements that include advertising content for the given video advertising template, one or more advertisement content elements based on specific content of the given episode of the given video program;
generating a customized video advertisement for the given episode of the given video program from the given video advertising template and the selected one or more advertisement content elements that are selected for the given episode of the given video program, wherein the customized video advertisement generated for the given episode using the given advertising template includes different advertisement content elements than other customized video advertisements generated for different episodes of the given video program based on the different episodes having different specific content than the given episode; and
providing the customized video advertisement for presentation during the future advertising availability occurring during the given episode of the given video program.

2. The computer-implemented method of claim 1, wherein, for each video advertising template, the advertisement content elements include one or more of:
video elements, each video element being data that generates video that can be used in a customized video advertisement;
audio elements, each audio element being audio data that generate audio that can be used in a customized video advertisement; or
text elements, each text element being data that generates text that can be used in a customized video advertisement.

3. The computer-implemented method of claim 2, wherein the given video advertising template includes:
keyword selection criteria specifying one or more keyword types for extracting keywords from electronic program guide descriptions of the episodes of the given video program; and
keyword matching criteria specifying, for each advertisement content element, one or more matching keywords for which the advertisement content element is eligible for inclusion in a video program advertisement template.

4. The computer-implemented method of claim 3, wherein selecting one or more advertisement content elements based on specific content of the given episode of the given video program comprises:
extracting, from the electronic program guide descriptions, one or more keywords of the one or more keyword types included in the electronic program guide description of the given episode of the given video program; and
selecting a given advertisement content element that has keyword matching criteria that specifies at least one of the extracted one or more keywords.

5. The computer-implemented method of claim 1, wherein each video advertising template further includes static advertisement content elements, each static advertisement content element being included in each customized video advertisement generated from the video program advertising template.

6. The computer-implemented method of claim 5, wherein, for each video program advertising template, the static advertisement content elements include one or more of:
video elements, each video element being data that generates video that can be used in a customized video advertisement;
audio elements, each audio element being audio data that generate audio that can be used in a customized video advertisement; or
text elements, each text element being data that generates text that can be used in a customized video advertisement.

7. The computer-implemented method of claim 1, wherein:
the given episode of the given program is presented on a first viewing device; and
providing the customized video program advertisement for presentation during the future advertising availability comprises providing the customized video advertisement for presentation on a second viewing device.

8. The method of claim 1, wherein the customized video advertisement is presented (i) during a commercial break between two sequential portions of the given episode or (ii) in an overlay that is rendered over content of the particular episode during playback of the particular episode.

9. The method of claim 1, wherein
each customized video advertisement generated from the given video advertising template presents at least a portion of video advertising template adjacent to an area of a display that is presenting an episode of a video program;
the given advertising template includes:
placeholders in which advertisement content elements selected for each episode are populated; and
static advertisement elements that are presented in each customized video advertisement generated using the given advertising template independent of episodes for which the customized video advertisements are generated.

10. A system, comprising:
one or more computers;
a data storage device storing a plurality of video advertising templates selectable for use in generating customized video advertisements;
for each video advertising template, a plurality of advertisement content elements that include advertising content for the video advertising template; and a memory in data communication with the one or more computers and storing instructions executable by the one or more computers that upon such execution cause the one or more computers to perform operations comprising:

identifying a future advertising availability scheduled to occur during a given episode of a given video program that has multiple episodes that each present different specific content of the given video program;

identifying a plurality of video advertising templates that are each associated with respective targeting criteria that specify one or more video programs each including multiple episodes during which customized video advertisements generated using the video advertising template are eligible to be presented;

selecting, from the plurality of video advertising templates, a given video advertising template for the given video program based at least on the given video program being specified by the targeting criteria for the given video advertising template;

selecting, from a plurality of advertisement content elements that include advertising content for the given video advertising template, one or more advertisement content elements based on specific content of the given episode of the given video program;

generating a customized video advertisement for the given episode of the given video program from the given video advertising template and the selected one or more advertisement content elements that are selected for the given episode of the given video program, wherein the customized video advertisement generated for the given episode using the given advertising template includes different advertisement content elements than other customized video advertisements generated for different episodes of the given video program based on the different episodes having different specific content than the given episode; and providing the customized video advertisement for presentation during the future advertising availability occurring during the given episode of the given video program.

11. The system of claim 10, wherein, for each video advertising template, the advertisement content elements include one or more of:
video elements, each video element being data that generates video that can be used in a customized video advertisement;
audio elements, each audio element being audio data that generate audio that can be used in a customized video advertisement; or
text elements, each text element being data that generates text that can be used in a customized video advertisement.

12. The system of claim 11, wherein the given video advertising template includes:
keyword selection criteria specifying one or more keyword types for extracting keywords from electronic program guide descriptions of the episodes of the given video program; and
keyword matching criteria specifying, for each advertisement content element, one or more matching keywords for which the advertisement content element is eligible for inclusion in a video program advertisement template.

13. The system of claim 12, wherein selecting one or more advertisement content elements based on specific content of the given episode of the given video program comprises:
extracting, from the electronic program guide descriptions, one or more keywords of the one or more keyword types included in the electronic program guide description of the given episode of the given video program; and
selecting a given advertisement content element that has keyword matching criteria that specifies at least one of the extracted one or more keywords.

14. The system of claim 10, wherein each video advertising template further includes static advertisement content elements, each static advertisement content element being included in each customized video advertisement generated from the video program advertising template.

15. The system of claim 14, wherein, for each video program advertising template, the static advertisement content elements include one or more of:
video elements, each video element being data that generates video that can be used in a customized video advertisement;
audio elements, each audio element being audio data that generate audio that can be used in a customized video advertisement; or
text elements, each text element being data that generates text that can be used in a customized video advertisement.

16. The system of claim 10, wherein:
the given episode of the given program is presented on a first viewing device; and
providing the customized video program advertisement for presentation during the future advertising availability comprises providing the customized video advertisement for presentation on a second viewing device.

17. A non-transitory computer storage medium encoded with a computer program, the program comprising instructions that when executed by one or more data processing apparatus cause the data processing apparatus to perform operations comprising:
identifying a future advertising availability scheduled to occur during a given episode of a given video program that has multiple episodes that each present different specific content of the given video program;
identifying a plurality of video advertising templates that are each associated with respective targeting criteria that specify one or more video programs each including multiple episodes during which customized video advertisements generated using the video advertising template are eligible to be presented;
selecting, from the plurality of video advertising templates, a given video advertising template for the given video program based at least on the given video program being specified by the targeting criteria for the given video advertising template;
selecting, from a plurality of advertisement content elements that include advertising content for the given video advertising template, one or more advertisement content elements based on specific content of the given episode of the given video program;
generating a customized video advertisement for the given episode of the given video program from the given video advertising template and the selected one or more advertisement content elements that are selected for the given episode of the given video program, wherein the customized video advertisement generated for the given episode using the given advertising template includes different advertisement content elements than other customized video advertisements generated for different episodes of the given video program based on the different episodes having different specific content than the given episode; and providing the customized video advertisement for presentation during the future advertising availability occurring during the given episode of the given video program.

18. The non-transitory computer storage medium of claim 17, wherein, for each video advertising template, the advertisement content elements include one or more of:

- video elements, each video element being data that generates video that can be used in a customized video advertisement;
- audio elements, each audio element being audio data that generate audio that can be used in a customized video advertisement; or
- text elements, each text element being data that generates text that can be used in a customized video advertisement.

19. The non-transitory computer storage medium of claim 18, wherein the given video advertising template includes:

keyword selection criteria specifying one or more keyword types for extracting keywords from electronic program guide descriptions of the episodes of the given video program; and keyword matching criteria specifying, for each advertisement content element, one or more matching keywords for which the advertisement content element is eligible for inclusion in a video program advertisement template.

20. The non-transitory computer storage medium of claim 19, wherein selecting one or more advertisement content elements based on specific content of the given episode of the given video program comprises:

extracting, from the electronic program guide descriptions, one or more keywords of the one or more keyword types included in the electronic program guide description of the given episode of the given video program; and selecting a given advertisement content element that has keyword matching criteria that specifies at least one of the extracted one or more keywords.

* * * * *

UNITED STATES PATENT AND TRADEMARK OFFICE
CERTIFICATE OF CORRECTION

| | |
|---|---|
| PATENT NO. | : 10,321,202 B2 |
| APPLICATION NO. | : 15/490676 |
| DATED | : June 11, 2019 |
| INVENTOR(S) | : Rowe et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 32 days.

Signed and Sealed this
Seventh Day of January, 2020

Andrei Iancu
*Director of the United States Patent and Trademark Office*